US008007955B2

(12) United States Patent
Blein

(10) Patent No.: US 8,007,955 B2
(45) Date of Patent: Aug. 30, 2011

(54) BIPOLAR PLATE FOR FUEL CELL WITH DEFORMED METAL DISTRIBUTION SHEET

(75) Inventor: Franck Blein, Avertin (FR)

(73) Assignee: Commissariat a l'Energie Atomique (FR)

( * ) Notice: Subject to any disclaimer, the term of this patent is extended or adjusted under 35 U.S.C. 154(b) by 1023 days.

(21) Appl. No.: 11/886,172

(22) PCT Filed: Mar. 14, 2006

(86) PCT No.: PCT/FR2006/050222

§ 371 (c)(1), (2), (4) Date: Sep. 10, 2007

(87) PCT Pub. No.: WO2006/097658

PCT Pub. Date: Sep. 21, 2006

(65) Prior Publication Data

US 2008/0145740 A1 Jun. 19, 2008

(30) Foreign Application Priority Data

Mar. 18, 2005 (FR) ..................................... 05 50704

(51) Int. Cl.
*H01M 8/04* (2006.01)
*H01M 2/40* (2006.01)
*H01M 4/64* (2006.01)

(52) U.S. Cl. ......................... 429/514; 429/457; 429/518

(58) Field of Classification Search .................. 429/457, 429/518, 514
See application file for complete search history.

(56) References Cited

U.S. PATENT DOCUMENTS 5,034,288 A * 7/1991 Bossel .......................... 429/457
5,981,098 A * 11/1999 Vitale ........................... 429/492
7,829,231 B2 * 11/2010 Formanski et al. ........... 429/434

FOREIGN PATENT DOCUMENTS

EP 0 714 147 A1 11/1994
EP 2001068132 3/2001
EP 1 445 814 A1 10/2002
EP 1 482 585 A1 2/2003
WO WO 03/088378 * 10/2003

* cited by examiner

*Primary Examiner* — Ula C Ruddock
*Assistant Examiner* — Thomas H Parsons
(74) *Attorney, Agent, or Firm* — Baker & Hostetler LLP

(57) ABSTRACT

The bipolar plate is of a relatively simple design and a low production cost. In addition, it only requires two supply ducts. It consists essentially of a separator (20) sandwiched between two distributors (14) each consisting of a deformed sheet so that a distribution channel (16A, 16B) is formed on each of the two sides. A central hole (15) is used to connect both channels so as to only form a single distribution channel from one end of the distributor to the other. The fuel and oxidant gases may be evacuated to the outside or collected in peripheral evacuation holes (28) similar to the supply holes (17).

18 Claims, 4 Drawing Sheets

BIPOLAR PLATE FOR FUEL CELL WITH DEFORMED METAL DISTRIBUTION SHEET

FIELD OF THE INVENTION

The invention relates to the field of fuel cells operating with a ceramic electrolyte, at high temperatures, but also that of electrolysers operating at high temperatures and wherein the operation is the opposite of that of the fuel cell.

STATE OF THE RELATED ART AND PROBLEM STATEMENT

Numerous types of fuel cells consist of a stack comprising, in alternation, basic elements and polar or bipolar plates. Each basic element comprises a membrane sandwiched between two electrodes, i.e. one anode and one cathode, whereto an oxidant and a fuel are continuously supplied, for example hydrogen and air. The bipolar plates make it possible to supply said oxidant and fuel simultaneously to two basic elements each adjacent to said bipolar plate.

Several stack concepts exist in the technologies implemented to date.

Figure 1:
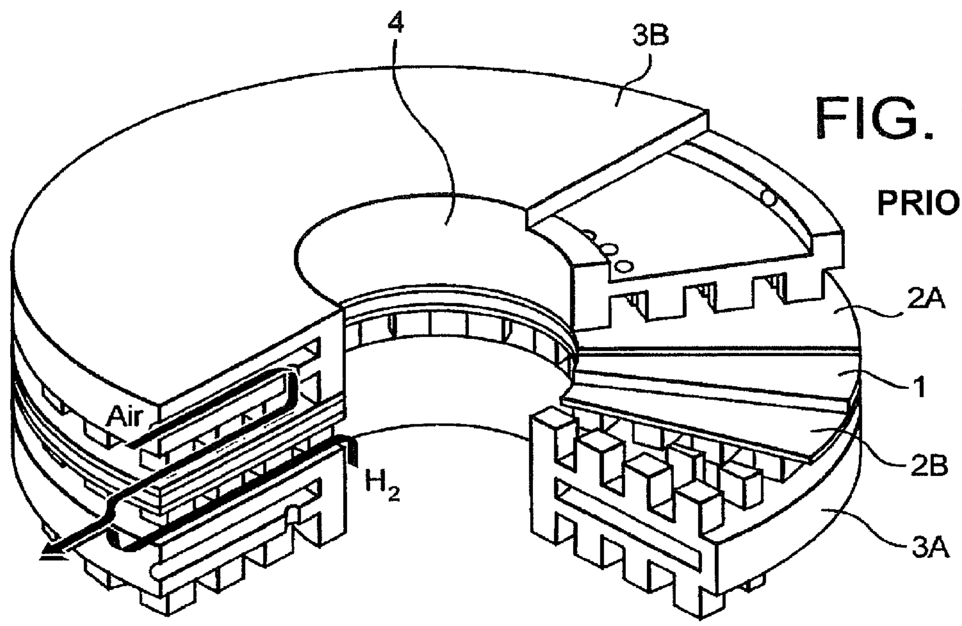

With reference to FIG. 1, a first concept consists of a stack of circular elements with the introduction of the fuel and oxidant gases via at least one external point and one central point. Each element of the stack, i.e. basic elements consisting of an electrolyte 1 positioned between two electrodes 2A and 2B and bipolar plates 3A and 3B, are of a circular shape and have a central hole 4. The bipolar plate 3A is a plate positioned between two basic elements, while the polar plate 3B is an end plate. The arrows show the air and hydrogen flow trajectories, each in a specific circuit of the bipolar plate. It is noted that hydrogen is introduced via the central hole 4 and is evacuated to the outside, while air is introduced from the outside and evacuated to the outside. The main drawback of this architecture is the fact that hydrogen is introduced via the central zone, which makes it necessary to ensure satisfactory tightness on each basic element between the cathode 2A and the central hole 4. A leak at this point would cause combustion between hydrogen and air in the cathodic compartment, which would induce a significant temperature rise liable to cause ceramic material cracking and thus degrade the cell's performances.

Another concept consists of introducing air and hydrogen via the centre of the cell, i.e. at the centre of each elementary stage. The residual gases are burned at the peripheral outlet of the cell. This type of concept represents the same drawbacks as for that represented in FIG. 1, apart from the fact that the combustion zone is not in direct contact with the active elements of the cell.

Finally, a third type of concept envisages that, for basic elements with a plane circular geometry, the gases are introduced from outside the cell. However, the choice of ceramic materials to fulfill this function requires the arrangement of gas supplies in the vicinity of the periphery of the active zones and may prove to be penalising, in the event of the loss of tightness and connection from the air and hydrogen supply. Here again, the appearance of hot local points is liable to cause the parts of the stack to crack.

The purpose of the invention is to remedy all these drawbacks and propose a different fuel and oxidant supply concept for a fuel cell stack.

SUMMARY OF THE INVENTION

Therefore, a first main subject of the invention is a bipolar fuel cell plate, intended to be mounted between two basic electrode/membrane/electrode elements and comprising at least two supply holes positioned peripherally.

According to the invention, the plate consists of a rigid metal separator adjacent to at least one first rigid metal distributor consisting of a deformed sheet, so as to form a distribution channel on each side of the plate, connected to each other by a central hole so as to form a single duct passing through the distributor and having a first end connected to a supply hole.

In a first main embodiment of the invention, two first distributors are arranged on each side of the separator.

Preferentially, said two distributors are identical.

In this case, it is possible that a second end of the at least one duct formed in this way opens onto the outside of the polar plate.

In this first case, it is advantageous to arrange a retaining ring in the duct formed in this way.

It is also possible that a second end of at least one duct formed in this way opens into a peripheral evacuation hole. Therefore, it is possible to have two different types of evacuation on a bipolar plate.

In a second preferential embodiment of the plate according to the invention, a second distributor is used, consisting of a rigid metal frame in the shape of a trough wherein a porous anodic substrate is located, said second distributor comprising a peripheral outlet passage connecting the porous substrate to a peripheral evacuation hole, the separator having in this case a supply duct connecting a supply hole at the centre of said separator, so as to open against the porous substrate.

In the use of the polar plate according to the invention, it is envisaged to use a peripheral seal during the composition of the stack of a fuel cell, between each bipolar plate according to the invention and the basic elements at the retaining ring and a seal around the supply and/or evacuation holes.

In this case, it preferable to provide mica seals.

LIST OF FIGURES

Figure 2A:
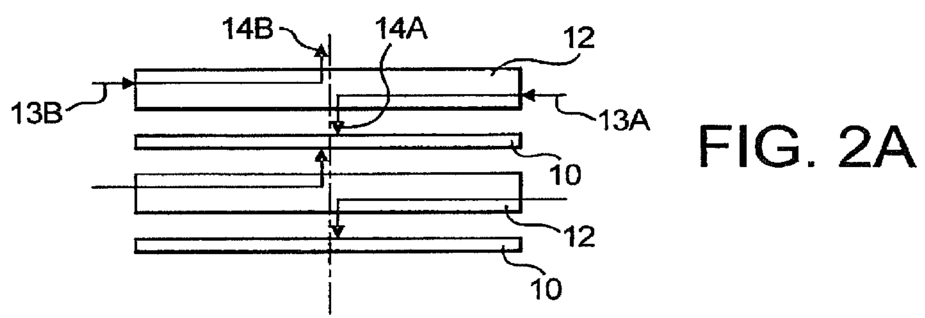
Figure 2B:
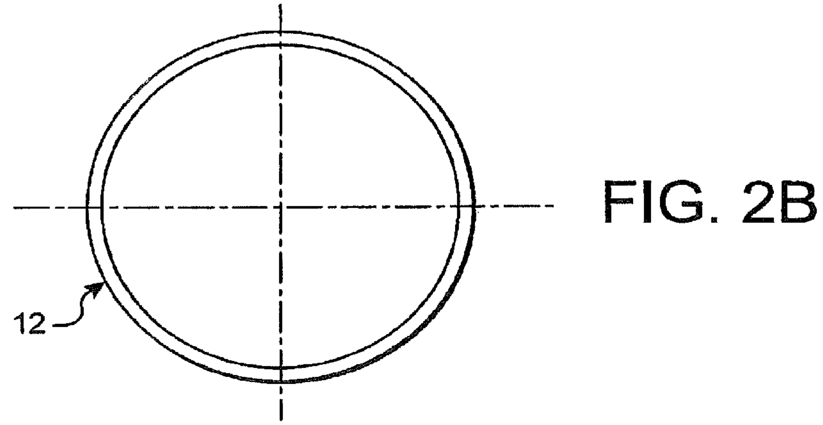
Figure 3A:
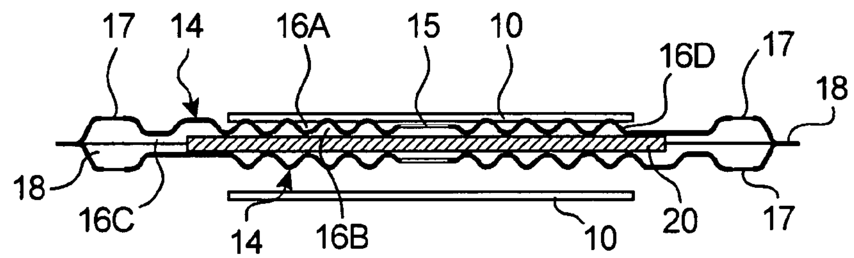
Figure 3B:
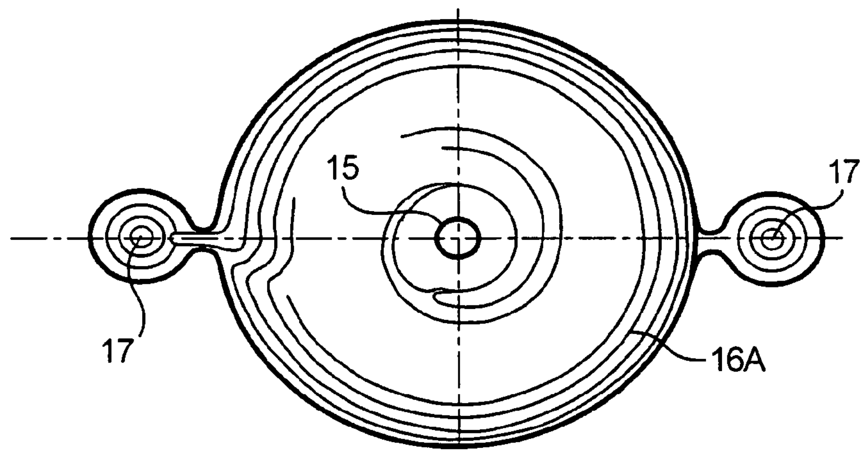
Figure 4:
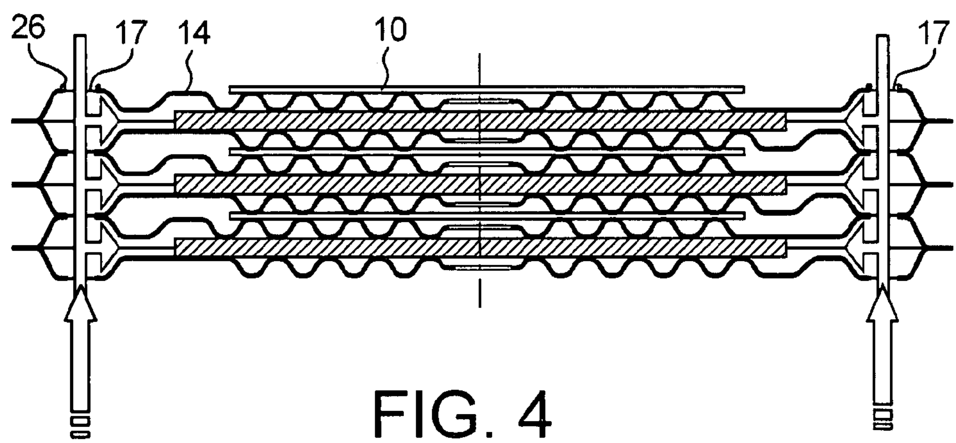
Figure 5A:
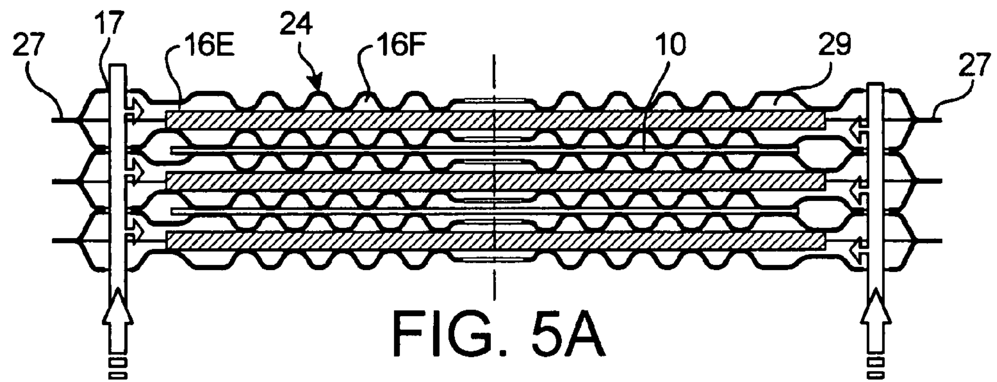
Figure 5B:
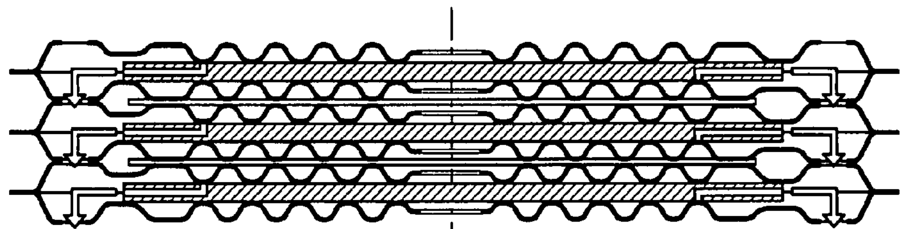
Figure 5C:
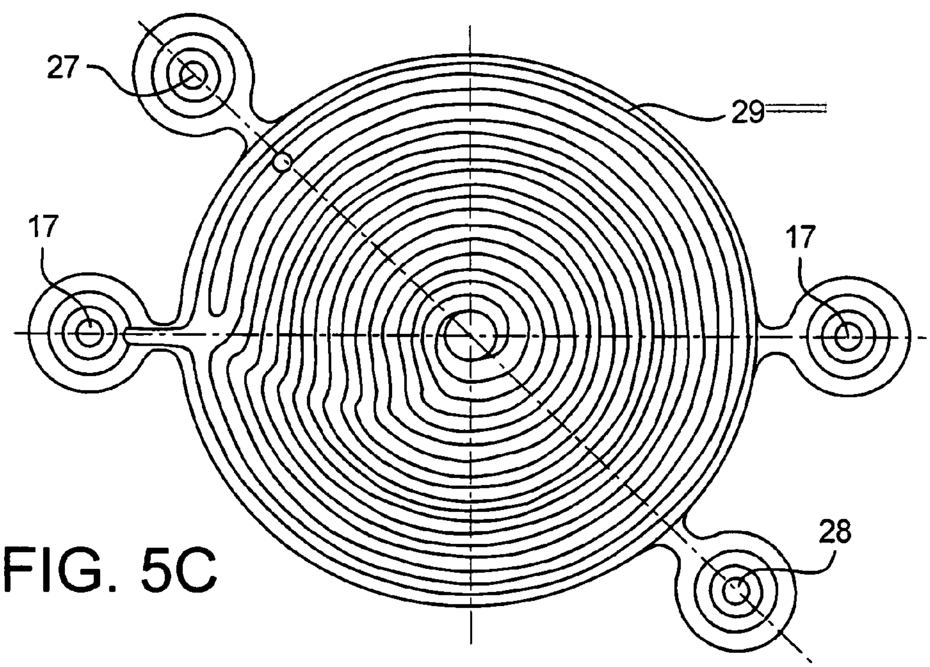
Figure 6A:
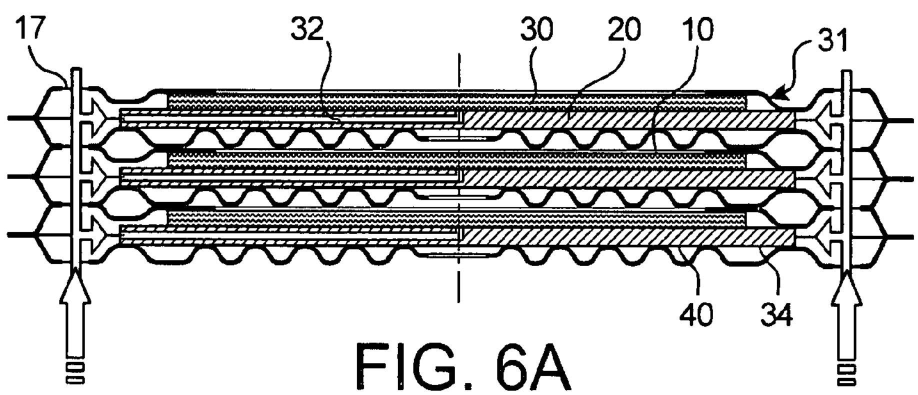
Figure 6B:
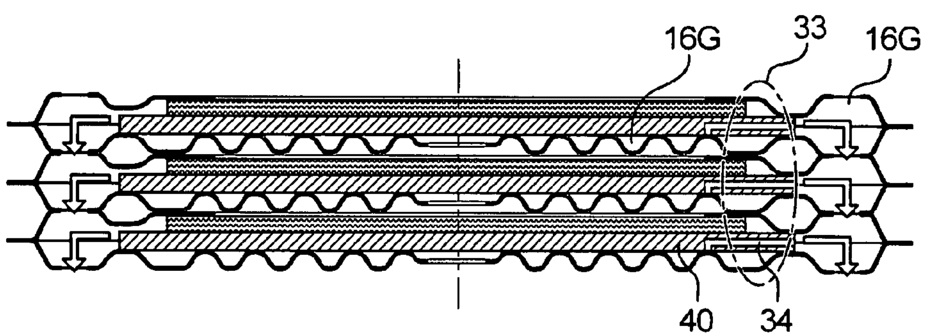
Figure 6C:
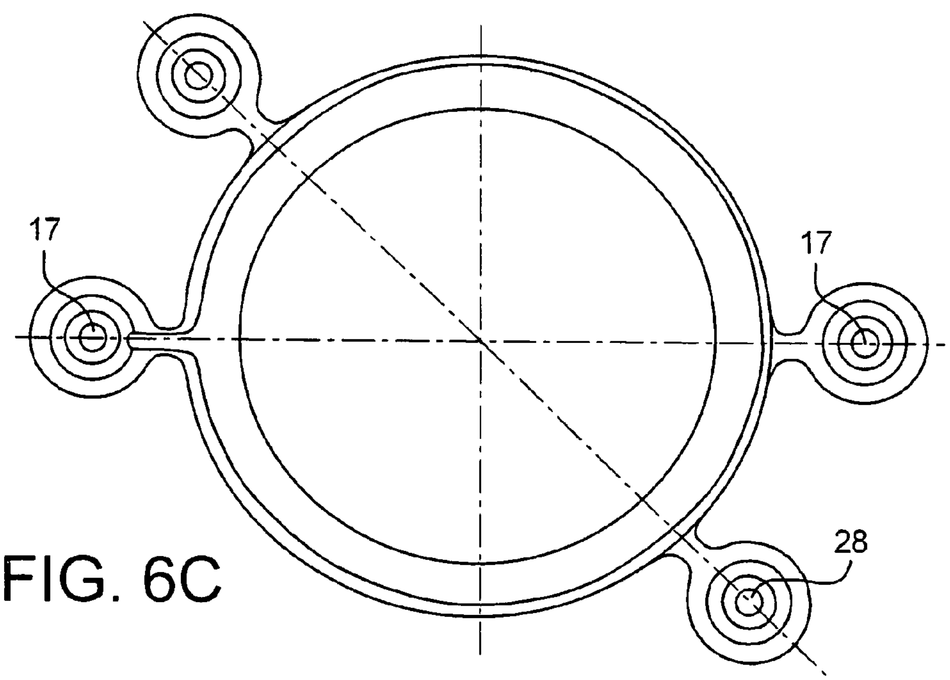

The invention and its various technical characteristics will be understood more clearly on reading the disclosure, accompanied by several figures representing respectively:

FIG. 1, already described, in an exploded profile view, a fuel cell concept according to the prior art;

FIGS. 2A and 2B, two diagrams relating to the operating mode of a bipolar plate according to the invention;

FIGS. 3A and 3B, a cross-section and a top view of two bipolar plates according to a first embodiment of the invention;

FIG. 4, in a cross-section, three fuel cell stages using bipolar plates according to the embodiment represented in FIGS. 3A and 3B;

FIGS. 5A, 5B and 5C, in a cross-section and top view, three stages of a fuel cell stack using bipolar plates according to the invention in a second embodiment thereof;

FIGS. 6A, 6B and 6C, in a cross-section and top view, three stages of a fuel cell stage using a bipolar plate in a third embodiment of the invention.

DETAILED DESCRIPTION OF SEVERAL EMBODIMENTS OF THE INVENTION

With reference to FIGS. 2A and 2B, the geometry of the basic elements 10 and the bipolar plates 12 according to the invention is circular. Electrodes from each basic element 10 are supplied respectively from above and below each by means of a bipolar plate 12 of the same circular geometry. Fuel and oxidant supplies, i.e. hydrogen or air, are provided from outside the assembly and routed to the centre of each electrode by means of a bipolar plate 12. For example, hydrogen is supplied in the direction 13A from outside the assembly to an electrode positioned below and adjacent to bipolar plate 12 in a direction 14A while air is supplied in the direction 13B to an electrode positioned above the bipolar plate 12 in the direction 14B.

On the basis of this principle, the difficulty in needing to provide the tightness of any central air or hydrogen supply shaft is avoided. The basic elements 10 and the bipolar plates 12 may be of the same diameter.

With reference to FIG. 3A or 3B, each bipolar plate according to the invention consists of a single rigid metal separator 20, consisting of a plane sheet and making it possible to ensure the mechanical rigidity of the whole. Said sheet is sandwiched between two rigid metal distributors 14, each consisting of a corrugated sheet which may be obtained, for example, by means of embossing. The corrugated distributor 14 comprises channels 16A and 16B on each face of the distributor 14 corresponding respectively to the separations existing between the parts of the channel formed on the other face. In other words, the corrugated sheet forming each distributor 14 has faces each having a complementary shape. This offers a great advantage which is to be able to form all the distributors from a single type of distributor. In other words, a single type of part is devised to produce said elements.

Moreover, the channels 16A and 16B each consist of a single channel, for example arranged in a spiral around the centre and leading thereto. FIG. 3B shows such a configuration. However, each separator 14 comprises, at its centre, a distribution hole 15 whereto the two channels 16A and 16B are connected. Due to this connection, each distributor actually comprises only one channel passing through its wall. One of the two channels, in this case the channel 16B, comprises a peripheral end 16C opening into a peripheral recess 18 of the distributor. For its part, the other channel 16A comprises an opposite end 16D opening outside the stack. It is envisaged that, once stacked in this way between a basic element 10 and a separator 20, each single channel consisting of the succession of channels 16A and 16B can enable the circulation of a gas from the peripheral recess 18 and being evacuated to the outside via the end 16D of the channel 16A opening to the outside. As, on each recess 18, there is a supply hole 17, it can be understood that either air or hydrogen may be sent against each face of a basic element 10 of the fuel cell formed in this way. The operation of the cell is completed by an electric current collector. The two distributors 14 may be assembled by means of soldering, peripherally, around the separator 20 which is then enclosed. The distribution hole 15 which enables the channel to pass from one side to the other is central. In fact, this makes it possible to use the entire reactive surface of the basic element 10 (electrode/membrane/electrode). During operation, heat is emitted. By means of a central supply, the same revolution symmetry is retained for the temperature mapping (hotter at centre and colder towards the outside, in a concentric fashion).

In order to form a stack making it possible to increase the power of a fuel cell, it is simply necessary to stack the different subassemblies formed in this way from a bipolar plate and a basic electrode/membrane/electrode element, on top of each other. The air or hydrogen supply shafts are thus formed as the assembly is carried out, by superimposing the supply holes 17.

With reference to FIG. 4, such a stack consisting of a series of basic electrode/membrane/electrode elements 10 and bipolar plates, as described above, must have some tightness.

To this end, at the supply holes 17, a seal 26 is placed around the supply hole 17 on the face of the bipolar plate 14 located opposite a basic electrode/membrane/electrode element 10. Such a seal 26 may be made of mica or be deposited by means of plasma. It is noted that if leaks occur at this point, they are located in a zone outside the active or functional part of the fuel cell and therefore have no impact on the integrity of the basic electrode/membrane/electrode element 10. In addition, this type of seal 26 ensures both the electrical insulation and tightness with respect to the gas.

With reference to FIGS. 5A, 5B and 5C, a second embodiment of the fuel cell concept according to the invention envisages that the fuel and oxidant gases and their residual product, after reaction, are retrieved, i.e. collected, separately, the tightness being ensured between the operation zone of the fuel cell and outside the stack. FIG. 5C illustrates, not only the supply holes 17, but also the evacuation holes 28 configured in a similar manner and each connected to the outlet of a line from each stage consisting of both sides of a distributor 24. In FIG. 5A a peripheral recess 27 exists similar in function to the peripheral recess 18 in FIG. 3A.

Unlike the previous embodiment, there is no possible outlet at the periphery for the residual gases and the fuel and the oxidant at the outlet of the distribution duct. A retaining ring 29, consisting of the last circle of the spiral shape of the duct, formed by the deformation of said distributor 24 and a second end 16E of the distribution channel 16F are used to connect said end to the evacuation hole 28. On the retaining ring 29, a seal is placed on the surface to be in contact with the basic electrode/membrane/element element 10, so as to ensure the tightness of the entire stack. In other words, a seal is placed on each face of the basic electrode/membrane/electrode element 10, in the periphery thereof.

It is also possible to envisage only retrieving the fuel and allowing the oxidant to escape. In this case, the distributors of the same bipolar plate are different.

With reference to FIGS. 6A, 6B and 6C, an embodiment according to the invention provides for the use of only one distributor as described above. In this case, a second type of distributor 30 is used, consisting of a porous substrate, such that the fuel or oxidant gas can flow throughout the volume of said porous substrate and be in contact with an electrode of the basic electrode/membrane/electrode element 10. Said porous substrate 30 is completed by a peripheral frame 31 which has the same shape, at the supply 17 and outlet 28 holes. In this case, the separator 40 comprises an evacuation channel 34 of the distribution channel 16G to the evacuation shaft.

Said porous substrate 30, is either assembled on the separator 20, or deposited by means of a coating technique. The material is either an electronic conductor or a combined, i.e. electronic and ionic, conductor.

The separation of the anodic compartment with the outside and the cathodic compartment with the outside is provided in this case also by means of an electrical insulating seal between two bipolar plates in the zone 33, i.e. at the position of the junction between the porous substrate and its frame 31. This embodiment makes it possible to provide a very good electrical contact between the bipolar plate and the porous substrate 30 partially constituting same and whereon an electrode of the basic electrode/membrane/electrode element 10 is deposited i.e. directly on the electrolyte if said porous substrate 30 consists of both an ionic and electronic conductor.

In this embodiment, the separator 20 comprises a supply channel 32 opening towards the centre of the bipolar plate and towards a supply hole 17.

ADVANTAGES OF THE INVENTION

In the embodiments proposed according to the invention, it is possible to eliminate hydrogen tightness problems while retaining a simplified stack assembly.

The tightness zones are in offset parts with respect to the functional zones of the cell. The number of inlets and outlets may be reduced to the number of one inlet and one outlet per compartment.

The spiral shape for the distribution duct has been proposed in this embodiment, other shapes may be envisaged, provided that the supply and outlet and tightness separation shaft composition principle for the outlet gases is retained.

This concept makes it possible to reduce the production costs of a bipolar plate substantially. In fact, in the first embodiment, the bipolar plate only consists of two different elements, i.e. one separator and two distributors, which may be obtained easily by embossing, which reduces production costs considerably.

The invention particularly applies to SOFC (Solid Oxide Fuel Cell) type cells.

The concept is independent of the type of fuel used at the anodic end (hydrogen, methane, hydrocarbon, etc.) and may function with the introduction of air or oxygen at the cathodic end.

The principle is also used on PCFC (Proton Ceramic Fuel Cell) type fuel cells.

Finally, by envisaging implementing the reverse operation of a fuel cell, it is possible to envisage a high-temperature electrolyser to produce hydrogen by means of water molecule dissociation in an electric current. However, only the version with gas separation at the outlet is applicable to such an electrolyser. It should be noted that both "oxygen anode" mode and "depolarised anode" mode may be implemented, either by an allo-thermal mode or by an auto-thermal mode.

The invention claimed is:

1. Bipolar plate for fuel cell intended to be fitted between two electrode/membrane/electrode elements (10), comprising at least two supply holes (17) positioned peripherally, comprising:

a rigid metal separator in the form of a plate (20) in an arrangement with;

at least one first rigid metal distributor (14) disposed on one side of said rigid metal separator with the distributor formed from a deformed metal sheet, such that its shape forms a distribution duct corresponding to channels (16A, 16B) extending on of each side of said sheet, and comprising a distribution hole (15) in said rigid metal distributor in communication with the channels (16A, 16B), so as only to form a single distribution duct with the distribution hole (15) passing through the distributor (14) in a direction aligned substantially transverse to the rigid metal separator.

2. Bipolar plate according to claim 1, characterized in that the distribution hole (15) is central.

3. Bipolar plate according to claim 1 further comprising at least two distributors (14) each positioned on an opposite side of the separator (20) in a sandwich arrangement.

4. Bipolar plate according to claim 3, characterized in that both distributors (14) are identical.

5. Bipolar plate according to claim 1, characterized in that the channels(16A, 16B) forming at least one duct has a peripheral end (16C) which opens to the outside of the bipolar plate.

6. Bipolar plate according to claim 1, further comprising a peripheral evacuation hole (17) in said rigid metal separator for the ingress and/or egress of air or hydrogen through said separator.

7. Bipolar plate according to claim 6, further comprising a distribution channel (16F) formed in said distributor and a retaining ring (29) forming the periphery of the distribution channel (16F).

8. Bipolar plate according to claim 6, further comprising at least one distribution duct (16F) connected to the peripheral evacuation hole (17)

9. Bipolar plate according to claim 1, further comprising a second distributor of a second type consisting of a metal frame (31) in the shape of a trough at the centre of which a porous substrate (30) is located, the separator (20) comprising a peripheral outlet passage (32) connecting the porous substrate (30) to a peripheral supply hole (17) and an evacuation channel (34) connecting the distribution channel (16G) to an evacuation hole (28).

10. Fuel cell consisting of a stack of several bipolar plates according to claim 1, along with a plurality of electrode/membrane/electrode elements (10).

11. Fuel cell according to claim 10, characterized in that at least one electrical and gas tightness seal (26) is used between the bipolar plates and the a plurality of electrode/membrane/electrode elements (10).

12. Fuel cell consisting of a stack of several bipolar plates according to claim 2, along with a plurality of electrode/membrane/electrode elements (10).

13. Fuel cell consisting of a stack of several bipolar plates according to claim 3, along with a plurality of electrode/membrane/electrode elements (10).

14. Fuel cell consisting of a stack of several bipolar plates according to claim 4, along with a plurality of electrode/membrane/electrode elements (10).

15. Fuel cell consisting of a stack of several bipolar plates according to claim 5, along with a plurality of electrode/membrane/electrode elements (10).

16. Fuel cell consisting of a stack of several bipolar plates according to claim 6, along with a plurality of electrode/membrane/electrode elements (10).

17. Fuel cell consisting of a stack of several bipolar plates according to claim 7, along with a plurality of electrode/membrane/electrode elements (10).

18. Fuel cell consisting of a stack of several bipolar plates according to claim 9, along with a plurality of electrode/membrane/electrode elements (10).

* * * * *